Patented Feb. 3, 1948

2,435,249

UNITED STATES PATENT OFFICE 2,435,249

SUGAR BASE COMPOSITION

Alexander M. Zenzes, New York, N. Y., assignor of one-half to Musher Foundation, Incorporated, New York, N. Y., a corporation of New York No Drawing. Application May 29, 1943,
Serial No. 489,256

15 Claims. (Cl. 99—142)

The present invention relates to providing a concentrated cane sugar base composition made out of low cost raw materials and which may be used as a concentrated flavor medium for the preparation of a maple flavored table syrup and fruit flavored jellies as well as for other food purposes.

The development of maple syrup and blends of maple syrup and refined cane sugars requires the use of expensive materials since maple sugar is extremely expensive in terms of sugar cost. Furthermore, in order to provide a fruit flavored jelly or syrup or any type of fruit flavored composition where natural flavors are used, the cost is extremely high and where imitation fruit flavors are employed, very unsatisfactory flavors are obtained characteristic of these synthetic materials which generally can be used only when blended with additional fruits and even then give poor imitations of the natural fruit product.

It is a purpose of the present invention to provide a cane sugar base composition which can be used both in the preparation of maple flavored table syrup as well as in the preparation of fruit flavored fruit products including jellies, jams and gums and which concentrated base material can be used without natural fruit flavors or synthetic or imitation flavors.

It is a further object of the present invention to provide a highly desirable and useful cane sugar base composition from low cost sugar materials which are generally obtained as residuary materials or byproducts in the sugar refining industry.

It is a further object to provide a cane sugar base composition which from a nutritional standpoint has the advantage of supplying a high mineral content, an alkaline digestive end effect and nutritional values that are fully the equivalent of extremely expensive natural materials which would otherwise have to be used in the preparation of food products for which the product of the present invention is employed.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, cane juice as expressed from the sugar cane and which cane juice has a very objectionable flavor and poor keeping quality is desirably treated with lime or given a mild alkali treatment and the cane juice then filtered. The cane juice thus obtained will carry those non-sugar impurities which resemble quantitatively and in their proportion of one to the other the non-sugar impurities of the original cane juice or the juice of the sugar cane as originally expressed.

The cane juice which has preferably been subjected to a lime treatment is then concentrated to permit the sucrose crystals to form and the raw sugar crystals thereby obtained as a result of the concentration of the cane juice may be removed by decantation of the non-crystallizable portion, filtration or centrifugalization.

These raw sugar crystals obtained from the cane juice which has preferably been subjected to the lime treatment are then washed to remove that portion of the raw sugar crystals which is contained in the outer surfaces of the individual crystals.

For example, the raw sugar crystals made from the limed cane juice may be placed into a centrifuge and washed with water to remove and concentrate the syrup film contained on the outer surfaces of the raw sugar crystals.

As the raw sugar crystals are washed in the centrifuge, the outer surfaces of the raw sugar crystals are removed and this outer film is then modified and used in accordance with the procedures of the present invention.

The outer film of the raw sugar crystals is desirably filtered through diatomaceous earth and there is preferably not used any charcoal, bone black, or other similar decolorizing agent in the filtration of the outer film.

The outer film may be concentrated either in a vacuum pan or in an open kettle and the filtration step may take place either before or after concentration.

This filtered, concentrated outer film containing the original non-sugar impurities of the cane juice will have a purity or a total sucrose content of from about 75% to about 83% although there may be some minor variations dependent upon the extent to which the raw sugar crystals are washed. Where the raw sugar crystals are washed for a longer period, the sucrose content may be as high as 87% and where the raw sugar crystals are washed with a relatively small amount of water the sucrose content may be as low as 70%.

The outer syrup film thus obtained is not thereafter subjected to any treatment with carbonates or phosphates or to other treatment which would modify or change the original non-sugar impurities of the cane juice as contained in the syrup film removed from the outer surface of the raw sugar crystals except as herein described.

The outer syrup film thus obtained is then subjected to an elevated temperature treatment between about 240° F. and 275° F. or more and preferably to between 255° F. and 260° F. at an acid pH, preferably between pH 4.7 and 5.8, and most desirably between pH 4.9 and 5.1 whereby there is obtained a reaction and modification of the non-sugar impurities contained in the outer syrup film of the raw sugar crystals to produce the desirable results of the present invention.

The outer syrup film may be heated in its concentrated or unconcentrated condition and the heat treatment may take place either before or after filtration. For example, the outer syrup film may be heated to between 255° F. and 260° F. in an open kettle, the syrup being continuously heated until the desired temperature is reached and following the heat treatment there may, where desired, be added to the concentrated syrup an additional amount of water to dilute the same.

The heat treatment may also be conducted in a pressure chamber where the concentration of the outer syrup film is maintained until the desired elevated temperature is reached.

The heat treatment is conducted to a sufficiently high temperature and for a sufficiently long period of time to complete the reaction and modification of the original non-sugar impurities contained in the outer syrup film. The time during which the outer syrup film is subjected to the elevated temperature depends upon the temperature used. The higher the temperature to which the outer syrup film is subjected, the shorter the time that is required completely to react and modify the outer syrup film.

Following the elevated temperature treatment the undissolved coagulated or precipitated material is removed as by filtration, centrifugalization or by sedimentation or decantation. For example, the outer syrup film of the raw sugar crystals containing between 70% and 87% total sucrose and desirably between 75% and 83% sucrose may be subjected to a temperature of 255° F. and held at that temperature for a period of from 3 to 7 minutes. The coagulated or precipitated material may then be removed.

In the filtration of the heat reacted and modified outer syrup film it is desirable to use an inert filtration agent such as diatomaceous earth. The use of activated carbon in the filtration of the heat reacted outer syrup film, unless the syrup has been or is to be acidified, has been found to be undesirable.

Where the outer syrup film has been heat reacted in an open vessel or at atmospheric pressure, the removal of the coagulated or precipitated material can take place before the syrup has been allowed to cool. Where desired, additional water can be added to dilute the syrup and to reduce its total solids content, for example, to between 60% and 80%.

As a result of the heat treatment of the outer syrup film removed from the raw sugar crystals which are produced from limed cane juice and followed by removal of the coagulated or precipitated or insoluble material, certain modifications take place in the syrup containing the original non-sugar impurities whereby desirable flavor complexes are developed.

The modified and reacted outer syrup film thus obtained may readily be utilized upon dilution with other sweetening agents in the production of a table syrup having a highly desirable maple-like flavor or fruit flavored jellies or gums in the preparation of other food products.

In using the heat reacted and modified outer syrup film it is desirable to add sweetening agents which would reduce the total ash content to between about 0.25% and 2.0% and desirably to between 0.5% and 1.5%.

For example, there may be added to the modified outer syrup film prepared in accordance with the procedures of the present invention from 1 to 12 parts of a sweetening agent and preferably from 2 to 5 parts of a sweetening agent to each one part of the modified outer syrup film, based upon their total solids content. Among the sweetening agents that may be added there are included any of the sugars such as sucrose, dextrose, glucose, corn syrup, lactose, etc.

Where it is desired to produce a table syrup of a maple-like flavor, between 4 and 10 and most preferably between 5 and 7 parts of a sweetening agent are combined with each part of the modified outer syrup film, all ingredients calculated on the dry basis.

Where it is desired to produce a fruit flavored jelly having a more intense fruit flavor characteristic such as that which would be similar to a prune jelly, between 1 and 2 parts of a sweetening agent are combined with each part of the modified outer syrup film.

Where it is desired to produce a jelly with a flavor characteristic similar to apple jelly, between 6 and 12 parts of the sweetening agent are combined with each part of the modified outer syrup film.

The desirable results of the present invention are only obtained where the outer syrup film of the raw sugar crystals have been adjusted to an acid pH below pH 7 followed by the elevated temperature treatment and whereby the acid and heat treatment produce a reaction to develop the desirable flavor complexes for use in accordance with the procedures of the present invention.

Preferably, the outer syrup film is acidified to a pH of between 4.7 and 5.8 and most desirably to between pH 4.9 and 5.1 followed by the elevated temperature treatment to between about 240° F. and 275° F. or more and preferably to between 255° F. and 260° F.

Hydrochloric acid is desirably used for the purpose of this acidity adjustment and acid reaction and the acidification is applied preferably to the outer syrup film before the outer syrup film is subjected to the elevated temperature treatment although much less preferred results can be obtained by acidifying the outer syrup film following the elevated temperature reaction.

Although hydrochloric acid is particularly desirable for this acidification, other acids, preferably the non-oxidizing and non-reducing acids, may be used such as phosphoric acid, sulphuric acid, tartaric acid or citric acid.

By the addition of the acid a chemical reaction occurs between the outer syrup film and the added acid whereby a modification takes place to change the flavor complexes into even more highly desirable flavors and aromas. This acid reaction further develops desirable taste and aroma complexes and is apart from the reaction which takes place as a result of the elevated temperature treatment.

The length of time within which the outer syrup film of the raw sugar crystals having an acid pH is to be heated will vary from an instantaneous heat treatment to a period of a few minutes such as less than about 15 minutes dependent particularly upon the pH of the outer syrup film. The lower the pH the shorter the period of time at the elevated temperature that is required to produce the desired reaction.

An instantaneous or flash heat treatment will produce the desirable results particularly where the outer syrup film is heated at the lower pH ranges, that is, below about pH 5.0 such as between pH 3 and pH 5.

Particularly, where the outer syrup film is subsequently to be combined with a sweetening agent, the pH of the outer syrup film may be adjusted even below 4.7 such as to about pH 3.0 followed by the heat modification and heat reaction and followed further by removal of the undissolved and coagulated materials. Under these circumstances, only an instantaneous or flash heat is needed to produce the desired results of the present invention.

The heat treatment, whether it be instantaneous at the lower pH ranges, or extended over a period of several minutes to about 15 minutes at the higher pH ranges, may be conducted in an open kettle at atmospheric pressure or in a closed chamber at higher pressures. Where an instantaneous heat treatment or where a heat treatment for a very short period of time is used, then it is preferable to employ a pressure chamber for the elevated temperature treatment of the acidified outer syrup film followed by removal of the coagulated and precipitated materials.

Where it is desired to avoid excessive inversion of the sucrose and where combined heat and acid modification has been conducted at very low pH ranges, immediately following the elevated temperature treatment the reacted and modified outer syrup film may be neutralized such as to within the desired pH range of 4.7 and 5.8 in order to avoid inversion and retain a sufficient quantity of sucrose.

As a result of the elevated temperature treatment to produce the acid and heat reacted product of the present invention and where the outer syrup film has been subjected to the elevated temperature for a period varying from an instantaneous treatment to several minutes, substantially no inversion takes place notwithstanding the presence of the acid.

Where it is desired to retain the purity of the heat and acid modified outer syrup film, the modified syrup may be cooled rapidly following the elevated temperature treatment and where desired may be concentrated to between 85 and 95 Brix to produce a solid or plastic mass composition.

Preferably, the combination of the two reactions, the first being the heat reaction and the second being the acid reaction, produces the most desirable results of the present invention.

As a result of the acid reaction there is also obtained a reduction in total color and the development of a color which makes the product more readily adaptable and useful for a table syrup, jelly, and other food purposes.

Desirably the acidification and heat modification may be conducted simultaneously and the acid reacted syrup may be subjected to the heat modification followed by filtration or removal of the coagulated or precipitated materials in accordance with the procedures of the present invention.

The pH adjustment of between 4.7 and 5.8 and desirably between 4.9 and 5.1 appears to represent the critical limits, which acidity appears to complete the modification of the objectionable tasting materials and to give the highly desirable flavor complexes to the product produced in accordance with the present invention.

Where the polycarboxylic aliphatic acids such as tartaric acid, citric acid, malic acid and their acid salts as well as other acids such as lactic acid, glycollic acid and phosphoric acid and also dibasic acids such as succinic acid and malonic acid as well as the sugar acids such as gluconic acids and saccharic acid are utilized, the acids themselves should be free of noticeable flavor and should be used for the sole purpose of reacting with the outer syrup film to produce the desired flavor complexes and the acid must be added in a sufficient quantity to produce the effective acidity in terms of pH concentration.

It has not been found desirable, however, to use reducing acids of the nature of sulphurous acid or oxidizing acids such as nitric acid which appear to form objectionable constituents.

The heat and acid reacted outer syrup film thus obtained has no characteristic whatever of the cane juice or of the raw sugar from which it is made. Furthermore, where a fruit flavored jelly is formed, the jelly bears no resemblance whatever to the original constituents used to produce the present concentrated sugar base composition.

The heat reacted and preferably the heat and acid reacted outer syrup film obtained in accordance with the procedures of the present invention is a concentrated material that may be used in the production of a wide variety of food products and preferably for combination with other sweetening agents, to the extent of 1 to 12 parts of the sweetening agent with each part of the concentrated sugar base composition.

The product of the present invention may, for example, be utilized as a concentrated sugar material in the preparation of table syrups, candies, confections, puddings, fruit jellies, confectionery gums, and beverages to give highly desirable and novel flavor characteristics.

For example, with the addition of from 1 to 12 parts of a sweetening agent to each part of the modified outer syrup film and upon further adjusting the pH of the composition to between 2.9 and 3.5, highly desirable jellies or confectionery gums may be obtained. Where desired, the concentrated sugar base composition of the present invention may be utilized in lieu of part of the sugar normally used in the production of jellies, jams, confections, puddings, ice cream, ices and sherbets or other food products.

When a fruit flavored jelly is made from the concentrated sugar base composition of the present invention this may be accomplished without the addition of any fruit flavor or fruit essential oils from natural or synthetic sources which are normally responsible for the flavors contained in pure or imitation fruit jellies.

Furthermore, the flavor complexes produced in accordance with the procedures of the present invention appear to be non-oxidizing and are retained even when subjected to high temperature boiling procedures. It has also been found that the amount of sucrose required, for example, in an ice cream or sherbet or in a candy can be reduced by about 20% to 30% when using the product of the present invention even though the total sucrose content may remain constant.

It has also been found that where the product of the present invention is used in the preparation of chocolate ice cream, chocolate puddings, fruit ices or sherbets, butterscotch puddings, etc., that the amount of artificial or natural flavor, such as of chocolate, fruit flavor or other flavor can be reduced by between 20% and 40% without reduction in total flavor. In other words, the composition of the present invention has unusual value for blending in other food products to enhance and bring out other flavors thereby requiring much less of such other flavors as well as much less of sugars that would otherwise have to be used.

As examples of products produced in accordance with the procedures of the present invention, the following are indicative:

Example I

Cane juice was limed and filtered and then concentrated whereby raw sugar crystals were formed. The raw sugar crystals were then washed in a centrifuge to remove the outer syrup film which was found to have a purity of 82.

The outer syrup film thus obtained was then heated in an open kettle until a temperature of 255° F. was reached, which temperature was maintained for 3 minutes and the syrup was then filtered through diatomaceous earth to remove precipitated materials.

Upon cooling this syrup was combined with an equal quantity of corn sugar syrup of the same total solids content and the combination was acidified to a pH of 3.0. The product thus obtained had the flavor of a concentrated prune juice and which upon the addition of pectin formed a true prune type jelly.

Example II

The outer syrup film of Example I was acidified to a pH of 5.1 with hydrochloric acid and then heated under pressure to a temperature of 260° F. for 1 minute followed by filtration through diatomaceous earth to remove undissolved materials.

1 part of this syrup was then combined with 2 parts of refined cane syrup and 4 parts of corn syrup and a highly desirable maple type table syrup was obtained which was found to be of great value not only as a table syrup but also in the manufacture of ice cream, ices, sherbets, puddings and beverages.

Example III

The outer syrup film of Example I was heated under pressure to 260° F. for 1 minute and then filtered to remove the coagulated materials. 1 part of the syrup thus obtained was combined with 8 parts of corn syrup and the combination acidified to a pH of 3.0.

The syrup thus obtained had a characteristic flavor of a concentrated apple or quince juice and upon the addition of pectin a highly desirable apple or quince type jelly was obtained.

It was also found that even improved results were obtained when the outer syrup film of Example I was first acidified to pH 5.0 followed by heating under pressure to 260° F. for 1 minute and then filtered to remove the coagulated materials. Where 1 part of the syrup thus obtained was combined with 8 parts of corn syrup and the combination then acidified to a pH of 3.0, improved results were obtained.

Example IV

The outer syrup film of Example I was acidified to pH 3.0 and then subjected to an instantaneous heat treatment under pressure to 265° F. The heat and acid reacted syrup thus obtained was immediately filtered and cooled.

One portion was neutralized with sodium carbonate to pH 5.1 and then one part of the neutralized reacted syrup was combined with two parts of refined cane syrup and four parts of corn syrup which gave a highly desirable maple type table syrup.

The other portion was combined with an equal weight of corn syrup and the combination adjusted to pH 3.0 which gave a highly desirable concentrated prune juice type syrup.

Where desired, the sweetening agent may be combined with the concentrated sugar base composition of the present invention before the heat modification and acid reaction or where a fruit type jelly is to be formed, the acidification to between pH 2.8 and 3.5 may be applied to the concentrated sugar base composition and the sweetening agent followed by the heat modification, but the preferred procedure of the present invention is the preparation of the concentrated sugar base composition by treatment of the outer syrup film in accordance with the procedures herein described.

The outer syrup film used in accordance with the procedures of the present invention may be used as removed from the outer surfaces of the raw sugars crystallized from the cane juice or from any subsequent raw sugars crystallized from redissolved raw cane sugar or mixtures thereof. For example, the raw sugars crystallized from the original cane juice may be washed to remove the outer syrup film or, where desired, that portion which has not been crystallized into raw sugar from the cane juice may be recombined with additional cane juice and crystallized further producing a second batch of raw crystallized sugar which may then be washed to remove the outer syrup film. The outer syrup film may be removed from any of these ray sugar crystals as produced from the original cane juice or from cane juice containing compositions which compositions contain as their non-sugar impurities the original non-sugar impurities of the cane juice.

Having described my invention, what I claim is:

1. A method of producing a concentrated sugar base composition, capable, upon dilution with a sweetening agent, of use as a table syrup, and upon acidification to pH 2.9 to 3.5, of use in the manufacture of fruit flavored syrups and jellies, which comprises removing the outer syrup film from the surfaces of raw cane sugar crystals, acidifying the said outer syrup film heat reacting and modifying said outer syrup film at a temperature of at least 240° F. and then filtering through an inert filtration agent.

2. A method of producing a concentrated sugar base composition which comprises treating cane juice with lime, filtering the limed cane juice, concentrating the juice until raw sugar crystals are formed, washing the raw sugar crystals to remove the outer syrup film from the surfaces of said crystals, acidifying the said outer syrup film heating the outer syrup film to a temperature of at least 240° F. and then filtering the said heat reacted outer syrup film through an inert filtration agent.

3. A method of producing a concentrated sugar base composition, capable, upon dilution with a sweetening agent, of use as a table syrup, and, upon acidification to pH 2.9 to 3.5, of use in the manufacture of fruit flavored syrups and jellies, which comprises removing the outer syrup film from the surfaces of raw cane sugar crystals, acidifying the said outer syrup film, modifying and reacting the acidified syrup film by subjecting to an instantaneous heat treatment under pressure at a temperature of at least 240° F, and then removing the coagulated and precipitated materials.

4. A method of producing a concentrated sugar base composition which comprises removing the outer syrup film from the surfaces of raw cane sugar crystals, heating and acidifying the said outer syrup film at a temperature of at least 240° F. and at a pH of between 4.7 and 5.8 and then removing the coagulated and precipitated materials.

5. A method of producing a concentrated sugar base composition which comprises removing the outer syrup film from the surfaces of crystallized raw cane sugar, acidifying the said outer syrup film to a pH of less than 5.8, heat reacting the acidified outer syrup film at a temperature of at least 240° F. and then removing the coagulated and precipitated materials.

6. A concentrated sugar base composition consisting of the modified, acidified and substantially uninverted soluble syrup film of the outer crystals of raw can sugar, said modified soluble syrup film containing heat reaction products which are formed by heating the film surrounding the outer crystals of raw can sugar to a temperature of at least 240° F. said soluble syrup film being free of precipitated and coagulated residues.

7. A concentrated sugar base composition consisting of the modified, acidified and substantially uninverted soluble syrup film of the outer crystals of raw cane sugar, said modified soluble syrup film containing heat reaction products which are formed by heating the film surrounding the outer crystals of raw cane sugar to a temperature of at least 240° F., said composition being free of coagulated materials and said acidified and heated composition containing 70% to 87% sucrose based on total solids said soluble syrup film being free of precipitated and coagulated residues.

8. A concentrated sugar base composition consisting of the modified and acidified soluble syrup film of the outer crystals of raw can sugar, said modified and acidified soluble syrup film containing heat and acid reaction products which are formed by heating the film surrounding the outer crystals of raw cane sugar to a temperature of at least 240° F. at a pH below 5.8.

9. A concentrated sugar base composition consisting of the modified and acidified soluble syrup film of the outer crystals of raw cane sugar, said modified and acidified soluble syrup film containing heat and acid reaction products which are formed by heating the film surrounding the outer crystals of raw cane sugar to a temperature of at least 240° F. at a pH below 5.8, said composition having a pH between 4.7 and 5.8.

10. A concentrated sugar base composition consisting of the modified soluble syrup film of the outer crystals of ray cane sugar, said modified soluble syrup film containing heat reaction products which are formed by heating the film surrounding the outer crystals of raw cane sugar to a temperature of at least 240° F. for at least several minutes at a pH below 5.8.

11. A concentrated sugar base composition consisting of the modified and acidified soluble syrup film of the outer crystals of raw cane sugar, said modified and acidified soluble syrup film containing heat and acid reaction products which are formed by heating the film surrounding the outer crystals of raw cane sugar to a temperature of at least 240° F. at a pH below 5.8, said acidified and heated soluble syrup film containing 70% to 87% sucrose based on total solids said soluble syrup film being free of precipitated and coagulated residues.

12. A method of producing a sugar base composition which comprises removing the outer syrup film from the surfaces of raw cane sugar crystals, heating and acidifying the said outer syrup film at a temperature of at least 240° F. and at a pH of between 4.7 and 5.8, removing the coagulated and precipitated materials, and then combining from 1 to 12 parts of a sugar to each 1 part of the heated, acidified and clarified outer syrup.

13. A process of obtaining a cane sugar product useful in the preparation of flavored products including jellies and jams without the addition of natural, synthetic or imitation flavors which comprises liming, filtering and concentrating cane juice to form raw sugar crystals, washing the raw sugar crystals in a centrifuge to remove the outer syrup film, heating the outer syrup film in an open kettle to a temperature of about 255° F. and maintaining this temperature for about 3 minutes, filtering the syrup through diatomaceous earth to remove the precipitated materials, combining the syrup with about an equal quantity of corn sugar syrup of about the same total sugar content, acidifying the combination to a pH of about 3 to obtain a product having a concentrated prune juice flavor, which upon the addition of pectin may be utilized to form a true prune type jelly.

14. A process of obtaining a cane sugar product useful in the preparation of flavored products including jellies and jams without the addition of natural, synthetic or imitation flavors which comprises liming, filtering and concentrating cane juice to form raw sugar crystals, washing the raw sugar crystals in a centrifuge to remove the outer syrup film, acidifying to a pH of about 5.1 with hydrochloric acid, heating under pressure to a temperature of about 260° F. for about one minute, filtering through diatomaceous earth to remove the undissolved material, combining the resultant syrup in the proportion of about 1 part by weight without about 2 parts by weight of refined cane syrup and about 4 parts by weight of corn syrup to produce a maple flavor table syrup.

15. A process of obtaining a cane sugar product useful in the preparation of flavored products including jellies and jams without the addition of natural, synthetic or imitation flavors which comprises liming, filtering and concentrating cane juice to form raw sugar crystals, washing the raw sugar crystals in a centrifuge to remove the outer syrup film, heating under pressure to 260° F. for about one minute, filtering to remove coagulated materials, combining about 1 part by weight of the resultant syrup with about 8 parts by weight of corn syrup, acidifying the combination to a pH of about 3 to produce a syrup having a concentrated apple flavor which upon the addition of pectin will produce a highly desirable apple flavored jelly.

ALEXANDER M. ZENZES.

REFERENCES CITED

The following references are of record in the file of this patent:

(References on following page)

UNITED STATES PATENTS

| Number | Name | Date |
|---|---|---|
| 2,072,895 | Lund | Mar. 9, 1937 |
| 2,098,604 | Whymper | Nov. 9, 1937 |
| 2,176,034 | Musher | Oct. 10, 1939 |
| 1,826,701 | Ames | Oct. 13, 1931 |
| 2,054,873 | Whitby | Sept. 22, 1936 |
| 2,261,919 | Pittman | Nov. 4, 1941 |
| 1,532,271 | Slay | Apr. 7, 1925 |

FOREIGN PATENTS

| Number | Country | Date |
|---|---|---|
| 16,540 | Great Britain | 1889 |
| 17,557 | Great Britain | 1890 |
| 28,742 | Great Britain | 1909 |
| 308,850 | Germany | Oct. 31, 1918 |